United States Patent
Sakakibara et al.

(10) Patent No.: US 9,648,415 B2
(45) Date of Patent: May 9, 2017

(54) VEHICLE APPROACH WARNING APPARATUS

(71) Applicant: ANDEN CO., LTD., Anjo, Aichi-pref. (JP)

(72) Inventors: Hiroshi Sakakibara, Anjo (JP); Hironari Tajimi, Obu (JP)

(73) Assignee: ANDEN CO., LTD., Anjo (JP)

( * ) Notice: Subject to any disclaimer, the term of this patent is extended or adjusted under 35 U.S.C. 154(b) by 22 days.

(21) Appl. No.: 14/331,411

(22) Filed: Jul. 15, 2014

(65) Prior Publication Data

US 2015/0035660 A1  Feb. 5, 2015

(30) Foreign Application Priority Data

Jul. 30, 2013 (JP) ................................. 2013-157693

(51) Int. Cl.
| | |
|---|---|
| *B60Q 1/00* | (2006.01) |
| *H04R 3/00* | (2006.01) |
| *B60C 5/00* | (2006.01) |
| *H04R 1/20* | (2006.01) |

(52) U.S. Cl.
CPC ............... *H04R 3/00* (2013.01); *B60C 5/008* (2013.01); *H04R 1/20* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 2011/0199199 A1* | 8/2011 | Perkins | B60Q 1/506 340/435 |
| 2012/0068836 A1* | 3/2012 | Konet | G10K 15/02 340/425.5 |
| 2012/0299717 A1 | 11/2012 | Yoshino et al. | |
| 2012/0299718 A1* | 11/2012 | Yoshino | B60Q 1/22 340/466 |

(Continued)

FOREIGN PATENT DOCUMENTS

| | | |
|---|---|---|
| JP | 07-322403 A | 12/1995 |
| JP | 2004-136831 A | 5/2004 |

(Continued)

*Primary Examiner* — Brian Zimmerman
*Assistant Examiner* — Kevin Lau
(74) *Attorney, Agent, or Firm* — Posz Law Group, PLC

(57) ABSTRACT

A vehicle approach warning apparatus outputting a warning sound signal for outputting a warning sound, and generating the warning sound according to the warning sound signal from a speaker, and notifying a pedestrian around a vehicle that the vehicle approaches to the pedestrian is provided. The vehicle approach warning apparatus includes a memory portion, a signal generation portion, a level adjustment portion, a signal synthesizing portion, and an amplifier. The memory portion stores a first sound source data for generating a signal of a low frequency component, and a second sound source data for generating a signal of a high frequency component. The signal generation portion generates the signal of the low frequency component, and the signal of the high frequency component. The level adjustment portion adjusts a level of the signal of the low frequency component and the high frequency component.

10 Claims, 7 Drawing Sheets

(56) References Cited

U.S. PATENT DOCUMENTS

| | | | |
|---|---|---|---|
| 2013/0038435 A1* | 2/2013 | Muroya | G10K 15/02 340/425.5 |
| 2013/0106599 A1 | 5/2013 | Nakayama et al. | |
| 2013/0177167 A1* | 7/2013 | Takahashi | B60Q 5/008 381/86 |
| 2014/0015654 A1* | 1/2014 | Nakayama | B60Q 5/00 340/425.5 |

FOREIGN PATENT DOCUMENTS

| | | | |
|---|---|---|---|
| JP | 2004136831 A * | 5/2004 | |
| JP | 2012-218662 A | 11/2012 | |
| JP | 2014-113963 A | 6/2014 | |

\* cited by examiner

FIG. 5A
FIG. 5B
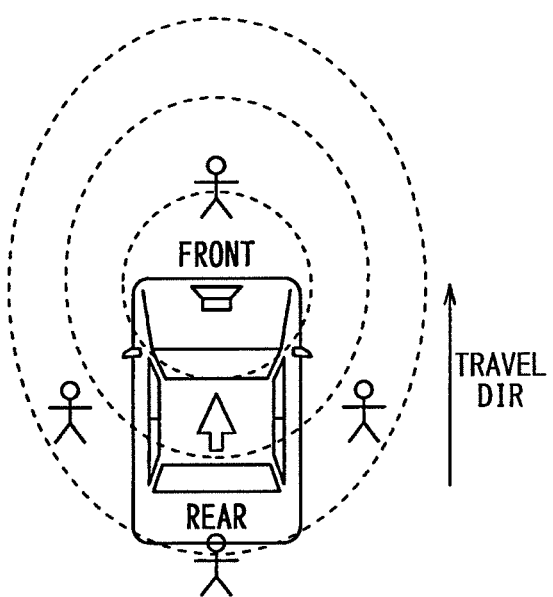
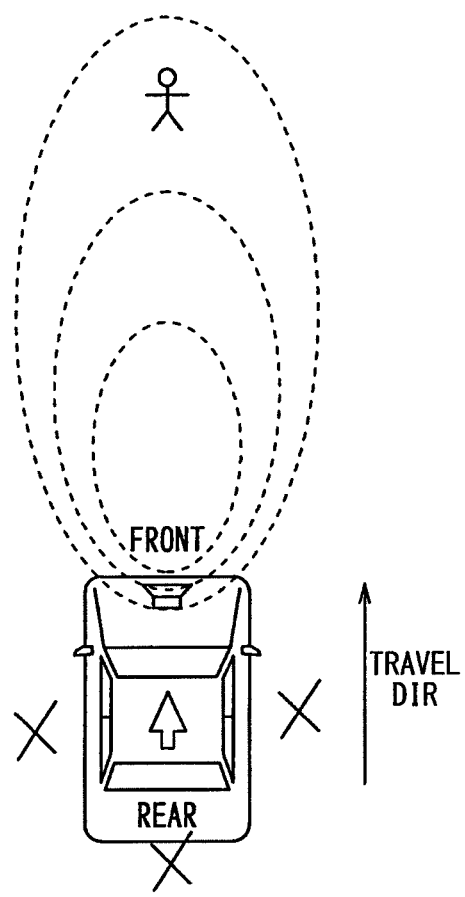

VEHICLE APPROACH WARNING APPARATUS

CROSS REFERENCE TO RELATED APPLICATION

This application is based on Japanese Patent Application No. 2013-157693 filed on Jul. 30, 2013, the disclosure of which is incorporated herein by reference.

TECHNICAL FIELD

The present disclosure relates to a vehicle approach warning apparatus outputting a signal of warning sound for outputting a warning sound, generating a warning sound from a speaker according to the signal of the warning sound, and notifying a pedestrian that a vehicle is approaching.

BACKGROUND

Patent document 1: JP-A-2004-136831

Recently, an electric vehicle (an EV vehicle), a hybrid vehicle (a HV vehicle), or the like only generates small noise according to a structural characteristic. A pedestrian may not notice approach of the vehicle. Therefore, so as to improve a recognition of the pedestrian that the vehicle exists near the pedestrian or the like, a vehicle approach warning apparatus generating a warning sound (a sound effect) may be mounted to the vehicle.

For example, patent document 1 discloses a vehicle approach warning apparatus in which a memory stores a sound source of a warning sound such as an engine start-up sound, a traveling-start sound, a low speed traveling sound similar to a sound generated when a vehicle travels at low speed, a medium speed traveling sound similar to a sound generated when the vehicle travels at medium speed, and a high speed traveling sound similar to a sound generated when the vehicle travels at high speed. The vehicle approach warning apparatus selects and outputs a different warning sound according to a vehicle speed or the like. Patent document 1 discloses that the warning sound is an impressive sound including a lot of a low frequency component at the time of low speed traveling. At the time of high speed traveling, the warning sound is a shrill sound including a high frequency component, so that a pedestrian may easily recognize the vehicle.

Since the apparatus described in patent document 1 selects and outputs different kinds of warning sounds according to vehicle speed or the like, a user may have uncomfortable feeling when the warning sound is discontinuously changed according to the vehicle speed. Many kinds of sound sources may be prepared, and the sound sources may be selected according to vehicle speed or the like, so that the warning sound is gradually changed so as to reduce the uncomfortable feeling. However, in the above case, the apparatus requires a large capacity memory. A cost for the apparatus may increase.

SUMMARY

It is an object of the present disclosure to provide a vehicle approach warning apparatus outputting a warning sound to improve recognition by a pedestrian around a vehicle by a small data amount of sound source data with eliminating uncomfortable feeling of a user caused when the warning sound is discontinuously changed.

According to one aspect of the present disclosure, a vehicle approach warning apparatus outputting a warning sound signal for outputting a warning sound, and generating the warning sound according to the warning sound signal from a speaker, and notifying a pedestrian around a vehicle that the vehicle approaches to the pedestrian is provided. The vehicle approach warning apparatus includes a memory portion, a signal generation portion, a level adjustment portion, a signal synthesizing portion, and an amplifier. The memory portion stores a first sound source data for generating a signal of a low frequency component, and a second sound source data for generating a signal of a high frequency component. The signal generation portion generates the signal of the low frequency component using the first sound source data, and the signal of the high frequency component using the second sound source data. The level adjustment portion adjusts a level of the signal of the low frequency component to generate an adjusted signal of the low frequency component, and a level of the signal of the high frequency component to generate an adjusted signal of the high frequency component. According to a vehicle speed, the speaker outputs the warning sound of which a recognition for the pedestrian around the vehicle is improved. The signal synthesizing portion outputs a synthesized warning sound signal synthesized from the adjusted signal of the low frequency component and the adjusted signal of the high frequency component. The amplifier amplifies the synthesized warning sound signal by a predetermined amplification factor, and outputs an amplified warning sound signal as the warning sound signal.

According to the vehicle approach warning apparatus in the present disclosure, the vehicle approach warning apparatus includes a memory portion storing a first sound source data for generating a signal of a low frequency component and a second sound source data for generating a signal of a high frequency component, generates the signal of the low frequency component using the first sound source data and the signal of the high frequency component using the second sound source data, adjusts a level of the signal of the low frequency component to generate an adjusted signal of the low frequency component, and a level of the signal of the high frequency component to provide an adjusted signal of the high frequency component, so that the speaker outputs, according to a vehicle speed, the warning sound of which a recognition for the pedestrian around the vehicle is improved, amplifies a synthesized warning sound signal synthesized from the signal of the low frequency component and the signal of the high frequency component after adjustment of each level by a predetermined amplification factor, and outputs the amplified warning sound signal. According to the vehicle approach warning apparatus, it is possible to output the warning sound to improve recognition by a pedestrian around the vehicle by a small data amount of sound source data with eliminating uncomfortable feeling of a user caused when the warning sound is discontinuously changed.

BRIEF DESCRIPTION OF THE DRAWINGS

The above and other objects, features and advantages of the present disclosure will become more apparent from the following detailed description made with reference to the accompanying drawings. In the drawings:

FIG. 5A is a drawing illustrating a distribution of the warning sound at the time of the low speed traveling of the vehicle approach warning apparatus according to the first embodiment;

FIG. 5B is a drawing illustrating a distribution of the warning sound at the time of the high speed traveling of the vehicle approach warning apparatus according to the first embodiment;

DETAILED DESCRIPTION

First Embodiment

Figure 1:
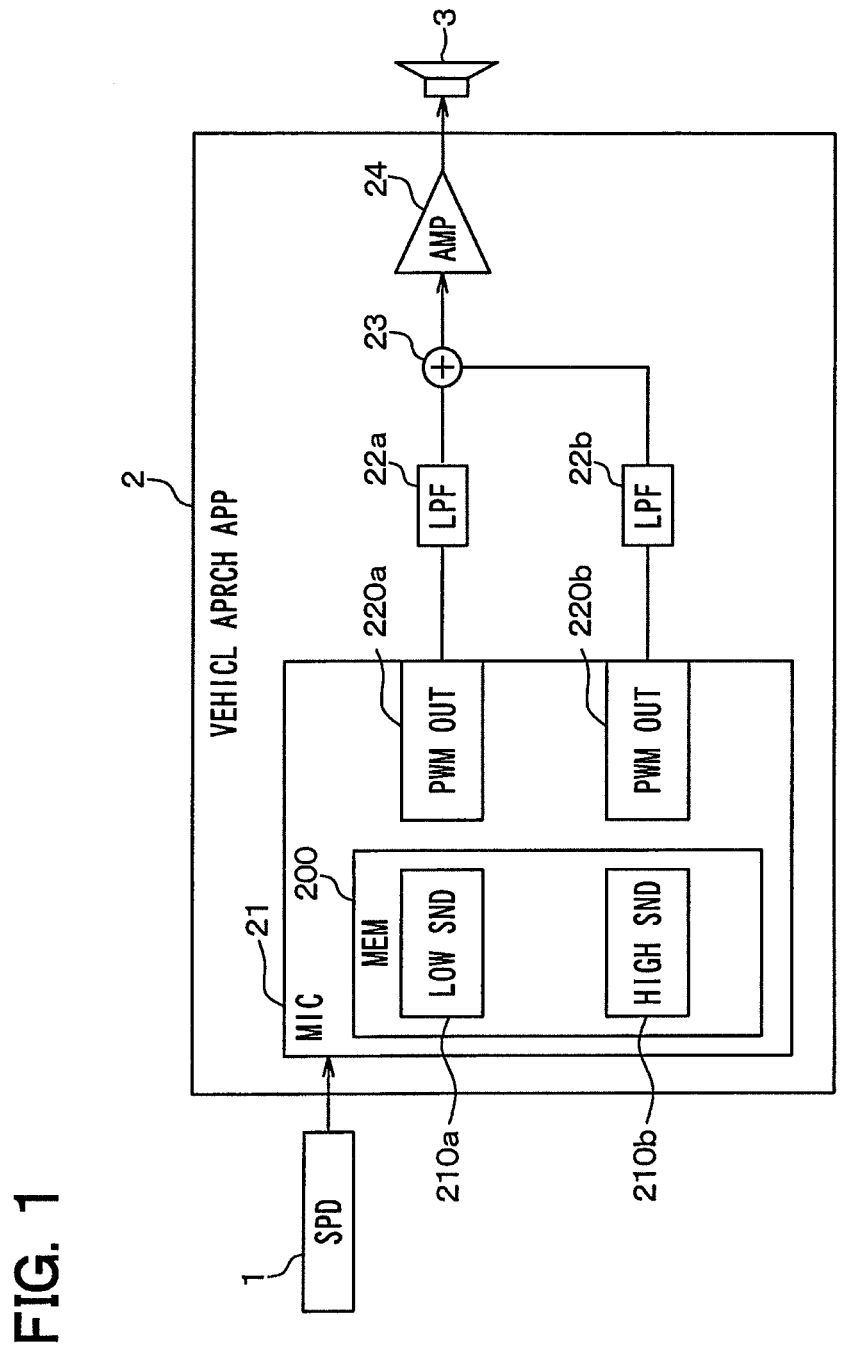
FIG. 1 is a drawing illustrating an entire configuration of a vehicle approach warning apparatus according to a first embodiment of the present disclosure.

FIG. 1 describes a configuration of a vehicle approach warning system having a vehicle approach warning apparatus according to a first embodiment of the present disclosure. The vehicle approach warning system includes a speed sensor 1, a vehicle approach warning apparatus 2, and a speaker 3.

The vehicle approach warning apparatus 2 outputs a signal of a warning sound for outputting the warning sound at the time of low speed traveling. When a vehicle travels at low speed, the vehicle makes a small road noise. The vehicle approach warning apparatus 2 outputs the warning sound according to the signal of the warning sound from one speaker, and notifies a pedestrian or the like around the vehicle that the vehicle exists or approaches to the pedestrian or the like. Incidentally, the vehicle approach warning apparatus 2 may be separated from a speaker 3. Alternatively, the vehicle approach warning apparatus 2 and the speaker 3 may be configured as a unit.

The speed sensor 1 outputs a signal of a vehicle speed to indicate a traveling speed of the vehicle. The vehicle approach warning apparatus 2 controls a sound generation according to the vehicle speed signal.

The vehicle approach warning apparatus 2 includes a microcomputer 21, a low pass filters (hereinafter, referred to as a LPF) 22a, 22b, a mixer 23, and an amplifier (AMP) 24. Incidentally, the vehicle approach warning apparatus 2 receives the signal of the vehicle speed from the speed sensor 1, and connects with the speaker 3.

The microcomputer 21 includes a memory 200, a PWM signal output portions 220a, 220b, and a not-shown operation portion, a not-shown I/O, or the like. The operation portion of the microcomputer 21 executes various processing according to the various programs stored in the memory 200. Incidentally, a PWM signal is a pulse width modulation signal.

In addition to the various programs, the memory 200 stores a sound source data 210a for a low frequency sound, and a sound source data 210b for a high frequency sound. The low frequency sound source data 210a is used for generating a signal of a low frequency component configuring a warning sound signal. The high frequency sound source data 210b is used for generating a signal of a high frequency component configuring the warning sound signal. The sound source data 210a, 210b are the PCM tone generator data, in which a signal of a frequency component is sampled and quantized, and magnitude of the acquired signal is changed into a numeric data.

Figure 2A:
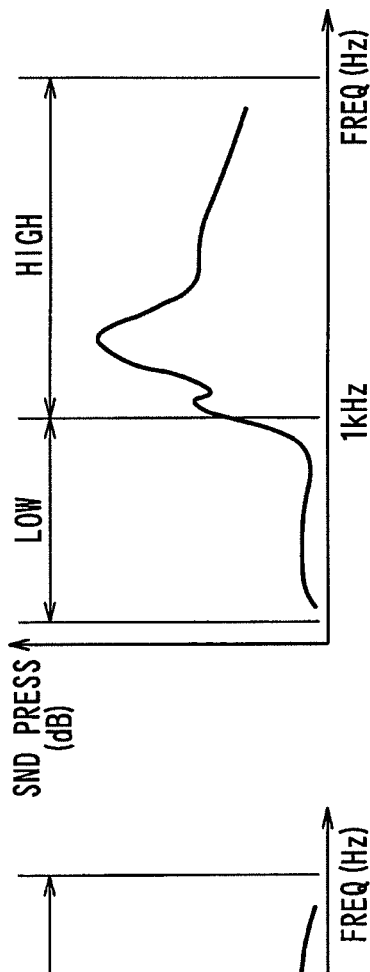
FIG. 2A is a drawing illustrating a frequency characteristic of a signal of a low frequency component.
Figure 2B:
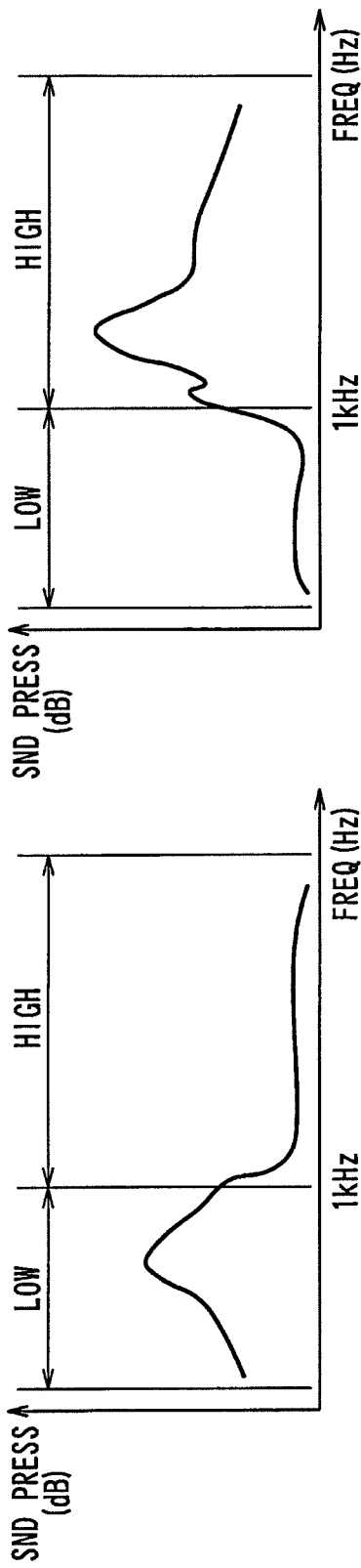
FIG. 2B is a drawing illustrating a frequency characteristic of a signal of a high frequency component.
Figure 2C:
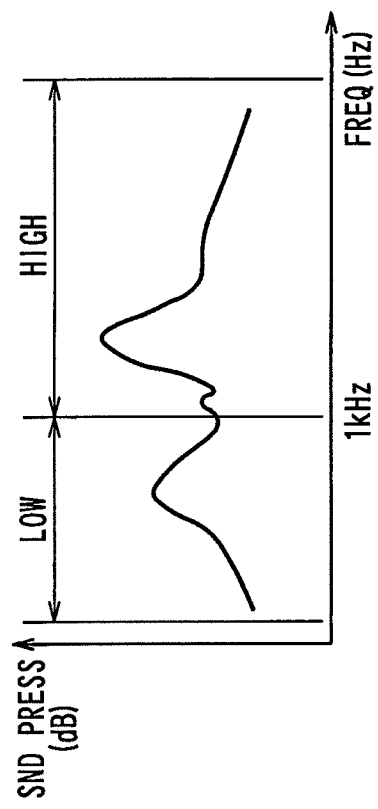
FIG. 2C is a drawing illustrating a frequency characteristic of a signal of a warning sound signal.

FIG. 2A to FIG. 2C illustrate a frequency characteristic of a signal of a low frequency component, a high frequency component, and a warning sound. FIG. 2A is a frequency characteristic of a signal of a low frequency component. FIG. 2B is a frequency characteristic of a signal of a high frequency component. FIG. 2C is a frequency characteristic of a warning sound signal, which is synthesized from the low frequency component and the high frequency component. FIG. 2C illustrates an example of a synthesized frequency characteristic generated from the data of the low frequency sound source described in FIG. 2A and the data of the high frequency sound source described in FIG. 2B. Incidentally, in the present embodiment, a frequency band of the low frequency component is 100 Hertz (Hz) to 900 Hz, and a frequency band of the high frequency component is 1500 Hz to 4000 Hz.

Each of the PWM signal output portions 220a, 220b outputs a PWM signal, by changing a duty ratio of a pulse wave and modulating according to a processing in the operation portion of the microcomputer 21.

The operation portion of the microcomputer 21 causes the PWM signal output portions 220a, 220b to independently output PWM signals based on each of the sound source data 210a, 210b according to the program stored in the memory 200. Each of the sound source data 210a, 210b is independently stored in the memory 200.

Specifically, the operation portion of the microcomputer 21 reads each of the sound source data 210a, 210b from the memory 200, and calculates duty ratios of the PWM signals from each of the sound source data 210a, 210b. The operation portion of the microcomputer 21 causes the PWM signal output portions 220a, 220b to output the PWM signals according to the calculated duty ratio in a processing. The operation portion of the microcomputer 21 repeats the processing.

The LPFs 22a removes a high frequency part from the PWM signal inputted from the PWM signal output portion 220a, and outputs signals. The LPFs 22b removes a high frequency part from the PWM signal inputted from the PWM signal output portion 220b, and outputs signals. The LPF 22a, 22b in the present embodiment convert the PWM signal into an analog signal.

The mixer 23 outputs the signal (corresponding to a synthesized warning sound signal in the present disclosure) of the warning sound signal synthesized from the signals inputted from the LPFs 22a, 22b.

The amplifier 24 amplifies the signal of the warning sound, which is outputted from the mixer 23 at a fixed amplification factor. The amplifier 24 sends current corresponding to the amplified signal (corresponding to an amplified warning sound signal in the present disclosure) of the warning sound through the speaker 3.

The speaker 3 outputs the warning sound according to the amplified signal of the warning sound, which is outputted from the amplifier 24. Incidentally, the speaker 3 outputs a warning sound with large sound pressure when the amount of current supplied from the amplifier 24 is large. In the present embodiment, the speaker 3 is attached to the inside or the like of a bumper, a fender, or the like of a vehicle. Incidentally, a piezoelectric type buzzer may be used as the speaker 3.

In the above described configuration, for example, the PWM signal output portion 220a of the microcomputer 21 outputs the PWM signal for generating a signal of the low frequency component, and the PWM signal output portion 220b of the microcomputer 21 outputs the PWM signal for generating a signal of the high frequency component. The PWM signals are converted into analog signals by the LPFs 22a, 22b. The signals converted into the analog signals are synthesized by the mixer 23 to generate a synthesized signal. The synthesized signal generated by the mixer 23 is amplified at the fixed amplification factor, and is outputted from the speaker 3 as sound.

An average voltage of the PWM signal is changed according to the duty ratio of the pulse wave. Therefore, when the duty ratio of each of the PWM signals outputted from the PWM signal output portions 220a, 220b becomes high as a whole, a level of signals outputted from the LPFs 22a, 22b will become high as a whole. On the contrary, when the duty ratio of each of the PWM signals outputted from the PWM signal output portions 220a, 220b becomes low as a whole, a level of signals outputted from the LPFs 22a, 22b will become low as a whole.

The operation portion of the microcomputer 21 in the present embodiment changes the duty ratio of each of the PWM signals outputted from the PWM signal output portions 220a, 220b according to the vehicle speed as a whole, and changes the level of the signals outputted from the LPFs 22a, 22b.

The low frequency sound in the present embodiment has the following characteristic as compared with a high frequency sound. The low frequency sound may diffract and spread to large areas such as an opposite side of a vibration plane of a speaker when there is an obstruction (e.g. a bumper of a vehicle). The low frequency sound may have low directivity. The low frequency sound may not be a jarring sound. The low frequency sound may be easily heard by elderly people.

On the contrary, the high frequency sound in the present embodiment has the following characteristic as compared with a low frequency sound. A pedestrian may easily recognize the high frequency sound than the low frequency sound. The high frequency sound may spread to a distance comparatively when there is no obstruction. The high frequency sound may have high directivity.

In addition, the low frequency sound and the high frequency sound in the present embodiment may not be masked by an environmental noise (a background noise) of the vehicle. The low frequency sound and the high frequency sound may be high efficiency frequency range since a sound pressure variation accompanying with a frequency characteristics of a speaker may not occur in the low frequency sound and the high frequency sound. Therefore, when a sound in the low frequency and the high frequency is varied and generated by the speaker as a sound, it may be possible that a warning sound having a proper frequency for recognition and acceptability to a pedestrian is generated. Incidentally, the sound pressure variation means a phenomenon that a sound pressure outputted from a speaker may be increase or decrease unintentionally when a frequency is varied.

For example, it may be possible to raise recognition of a pedestrian around the vehicle by simply raising a level of sound pressure of a low frequency sound (a lower frequency) or a high frequency sound (a higher frequency). However, in such a case, a pedestrian around the vehicle may sense a warning sound as being noisy, or silence in a passenger compartment of the vehicle may fall. Therefore, it may be preferable that the pedestrian around the vehicle may not sense the warning sound as being noisy, and silence in the passenger compartment may not fall. It may be preferable that, by considering a positional relationship of the pedestrian and the vehicle, the warning sound is outputted at a level of indispensable sound pressure so that the pedestrian around the vehicle recognizes the warning sound.

The vehicle approach warning apparatus 2 performs a sound pressure level control of the warning sound as described below by controlling each of the characteristics of the high frequency sound and the low frequency sound, so that a recognition of the pedestrian or the like is secured, the pedestrian around the vehicle does not sense the warning sound as being noisy, and silence in the passenger compartment does not fall.

Figure 3:
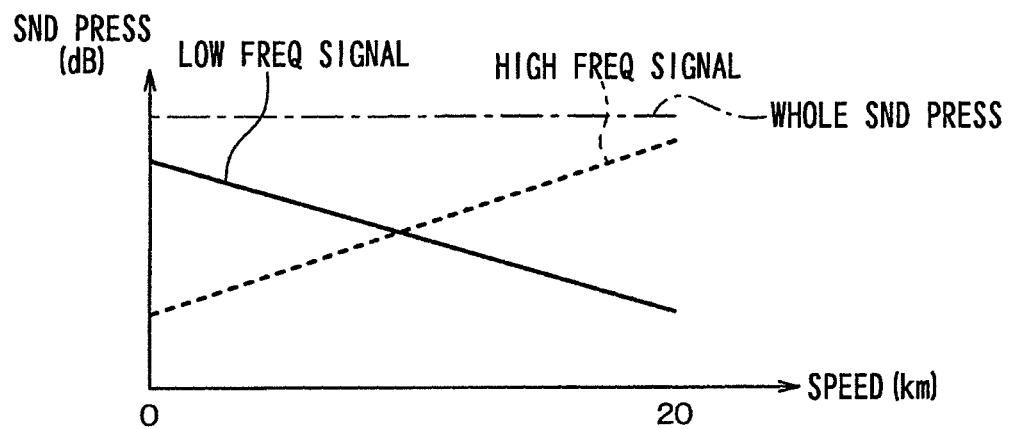
FIG. 3 is a drawing illustrating a relationship of a sound pressure of a low and high frequency component, which are included in the warning sound of the vehicle approach warning apparatus, and a vehicle speed in the first embodiment.

As described in FIG. 3, the vehicle approach warning apparatus 2 in the present embodiment gradually decreases the sound pressure of the low frequency component contained in the warning sound, and gradually increases the sound pressure of the high frequency component contained in the warning sound when the vehicle speed increases.

Figure 4A:
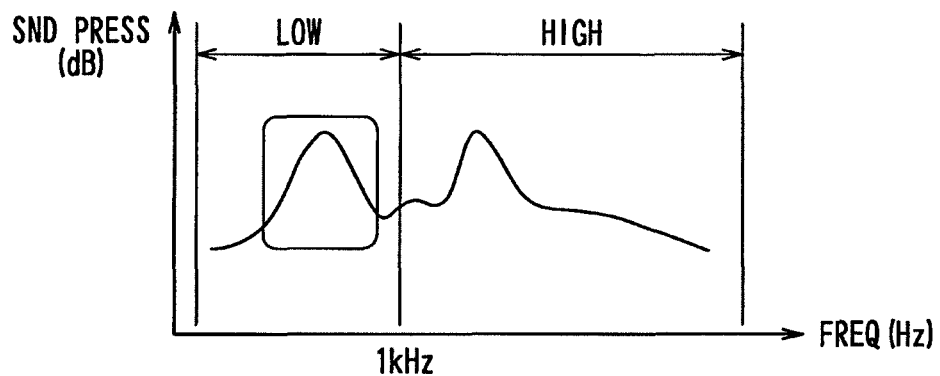
FIG. 4A is a drawing illustrating a sound pressure characteristic of the warning sound at the time of the low speed traveling.
Figure 4B:
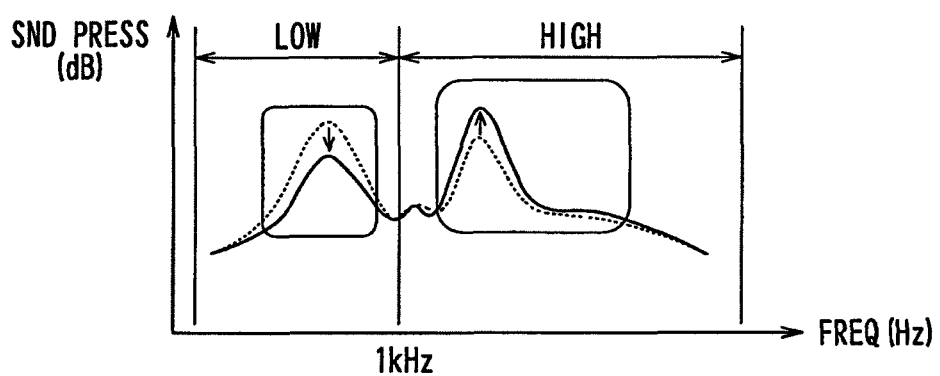
FIG. 4B is a drawing illustrating a sound pressure characteristic of the warning sound at the time of the medium speed traveling.
Figure 4C:
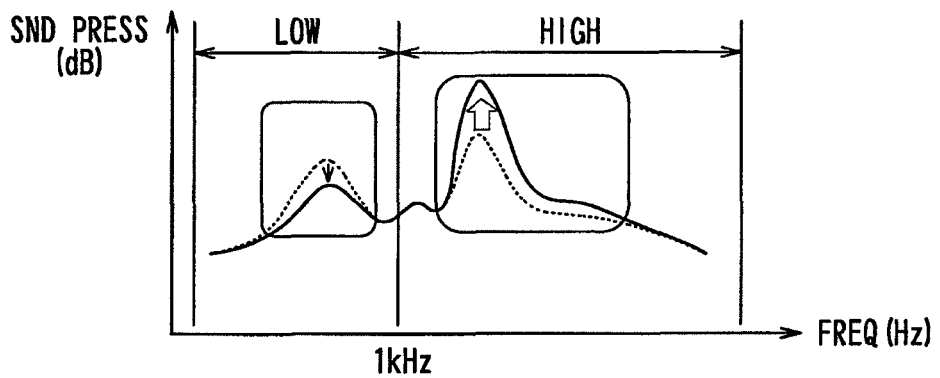
FIG. 4C is a drawing illustrating a sound pressure characteristic of the warning sound at the time of the high speed traveling.

FIG. 4A to FIG. 4C illustrate a difference in the sound pressure characteristic of the warning sound at the time of a low speed traveling, a medium speed traveling, and a high speed traveling. Incidentally, a travel speed at high speed traveling corresponds to about 20 km/h. FIG. 4A illustrates the sound pressure characteristic of the warning sound at the time of the low speed traveling. FIG. 4B illustrates the sound pressure characteristic of the warning sound at the time of the medium speed traveling. When the vehicle travels at the medium speed, the level of the sound pressure of the low frequency is decreased, and the level of the sound pressure of the high frequency is increased. FIG. 4C illustrates a characteristic of the sound pressure of the warning sound at the time of the high speed traveling. When the vehicle travels at the high speed, the level of the sound pressure of the high frequency increases as compared with a case where the vehicle travels at the medium speed. Incidentally, in the present embodiment, the medium speed corresponds to an intermediate speed between the low speed (about 0 km/h) and the high speed (about 20 km/h, in the present embodiment).

The sound pressure characteristic at the time of the low speed traveling (e.g. near 0 km/h) is illustrated in FIG. 4A. As compared with a case of the medium speed traveling described in FIG. 4B, the sound pressure level of the low frequency component (low frequency) spreading to large areas such as a vehicle rear area is high, and the sound pressure level of the high frequency component (high frequency) is low.

When the vehicle speed rises and becomes medium speed, as described in FIG. 4B, the sound pressure level of the low frequency component (low frequency) spreading to large areas such as vehicle rear area is lowered. The sound pressure level of the high frequency component (high frequency), which is easily recognized by a pedestrian and comparatively spreading to a distance, increases. Incidentally, in this case, the sound pressure level of the warning sound is not changed as a whole.

When the vehicle speed rises further and becomes high speed (e.g. near 20 km/h), as described in FIG. 4C, the sound pressure level of the low frequency component (low frequency) spreading to large areas such as vehicle rear area is lowered further. The sound pressure level of the high frequency component (high frequency), which is easily recognized by a pedestrian and comparatively spreading to a distance, increases further. Also in this case, the sound pressure level of the warning sound is not changed as a whole. A square having a rounded corner in the low frequency of FIG. 4A to FIG. 4C represents a frequency region from 100 Hz to 900 Hz, and a square having a rounded corner in the high frequency of FIG. 4B to FIG. 4C represents a frequency region from 1500 Hz to 4000 Hz.

FIG. 5A and FIG. 5B illustrate distribution (also referred to as a transmission) of the warning sound at the time of the low speed traveling and the high speed traveling, respectively. FIG. 5A illustrates the distribution of the warning sound at the time of the low speed traveling. FIG. 5B illustrates the distribution of the warning sound at the time of the high speed traveling. Incidentally, the distribution of the warning sound corresponds to a sound propagation of the warning sound. It is supposed that the vehicle travels forward (i.e. a front direction) in FIG. 5A, FIG. 5B, FIG. 9A, and FIG. 9B.

The sound pressure level of the low frequency component (low frequency) spreading to large areas such as a vehicle rear area is high, and the sound pressure level of the high frequency component (high frequency) is low at the time of the low speed traveling. Therefore, as described in FIG. 5A, it is possible to notify a pedestrian existing near and around the vehicle (in each direction of front, rear, right and left near the vehicle) of the warning sound.

On the contrary, at the time of the high speed traveling, the sound pressure level of the low frequency component (low frequency) spreading to large areas is lowered, and the sound pressure level of the high frequency component (high frequency), which is easily recognized by a pedestrian at a comparatively distance from the vehicle, is increased. As described in FIG. 5B, it is possible to notify a pedestrian existing in a traveling direction of the vehicle and comparatively distant from the vehicle of the warning sound. Since the sound pressure level of the low frequency component (low frequency) is reduced, the propagation of the warning sound into the passenger compartment by diffraction is reduced, and it is possible to reduce uncomfortable to the occupant.

The microcomputer 21 of the vehicle approach warning apparatus 2 maintains the sound pressure level of the warning sound in a predetermined range as a whole, adjusts the level of the signal of the low frequency component and the level of the signal of a high frequency component, and causes the speaker 3 to output the warning sound so that recognition to a pedestrian around the vehicle is improved according to increase of the travel speed.

Incidentally, a signal after the level of the signal of the low frequency component is adjusted corresponds to an adjusted signal of the low frequency component, and a signal after the level of the signal of the high frequency component is adjusted corresponds to an adjusted signal of the high frequency component.

Figure 6:
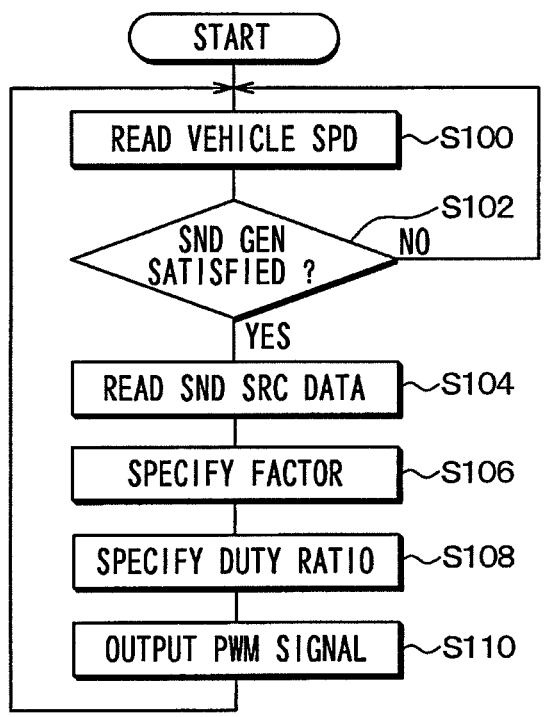
FIG. 6 is a flowchart in a microcomputer of the vehicle approach warning apparatus according to the first embodiment.

FIG. 6 is a flowchart of an operation portion of the microcomputer 21. When an ignition switch of the vehicle is turned on, the operation portion of the microcomputer 21 performs periodically a processing described in FIG. 6.

The operation portion of the microcomputer 21 reads a vehicle speed signal from the speed sensor 1 (S100). The operation portion of the microcomputer 21 determines whether a sound generation condition is satisfied (S102). In the present embodiment, when the vehicle speed is equal to or less than 20 km/h, it is determined that the sound generation condition is satisfied, and when the vehicle speed exceeds 20 km/h, it is determined that the sound generation condition is not satisfied.

When the vehicle speed is equal to or less than 20 km/h, a determination of S102 corresponds to YES, and the low-frequency sound source data 210a and the high-frequency sound source data 210b are read from the memory 200 (S104).

Based on the vehicle speed, a factor for specifying the duty ratio of the PWM signal is specified (S106). The memory 200 stores a table, representing that an output level of the PWM signal corresponding to the low frequency component signal decreases and the output level of the PWM signal corresponding to the high frequency component increases according to an increase of the vehicle speed. Specifically, the memory 200 stores the table of a relationship of the vehicle speed and the factor to change the duty ratio of the PWM signal as a whole.

Figure 7:
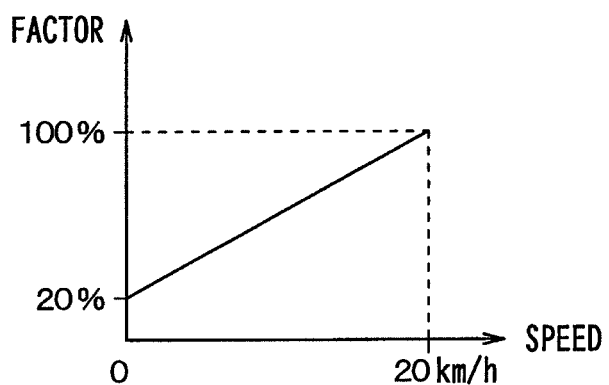
FIG. 7 is a drawing illustrating an example of a table indicating a relationship between a factor and a vehicle speed with respect to a PWM (pulse-width modulation) signal corresponding to a signal of a high frequency component.

FIG. 7 is an example of a table (corresponding to a first table) of a relationship between the vehicle speed and the factor of the PWM signal corresponding to the signal of the high frequency component. As described in FIG. 7, the memory 200 stores the table representing the factor (corresponding to a first factor) with respect to the PWM signal corresponding to the signal of the high frequency component linearly increasing with the increase of the vehicle speed. In addition, the memory 200 stores another table (corresponding to a second table) representing the factor (corresponding to a second factor) with respect to the PWM signal corresponding to the signal of the low frequency component linearly decreasing with the increase of the vehicle speed. In this processing, by referring to the table, the factors corresponding to the vehicle speed are specified with respect to the PWM signal corresponding to the signal of the low frequency component and the high frequency component.

At S108, the duty ratio of each of the PWM signal outputted from the PWM signal output portions 220a, 220b is specified. Specifically, each of the duty ratios of the PWM signals is calculated from the sound source data 210a, 210b, which are read out from the memory 200. That is, the first factor that corresponds to the vehicle speed is specified based on the first table, and the second factor that corresponds to the vehicle speed is specified based on the second table. Each of the duty ratios of the PWM signals is multiplied by the factors specified at S106. The duty ratios of the PWM signals, which are outputted from the PWM signal output portions 220a, 220b, are specified.

The operation portion of the microcomputer 21 controls the PWM signal output portions 220a, 220b to output the PWM signal (S110). Specifically, the operation portion of the microcomputer 21 controls the PWM signal output portions 220a, 220b to send out the PWM signal of the duty ratio specified at S108 to the LPFs 22a, 22b. The processing returns to S100.

The above processing is repeatedly performed. The PWM signal output portion 220a repeatedly outputs the PWM signal of the low frequency component. The PWM signal output portion 220b repeatedly outputs the PWM signal of the high frequency component. Incidentally, the PWM signals respectively are converted into analog signals by the LPFs 22a, 22b, and synthesized by the mixer 23. The synthesized signal is amplified at a fixed amplification factor by the amplifier 24 to generate an amplified warning sound signal. The amplified warning sound signal is outputted from the speaker 3 as the warning sound.

As described above, the vehicle approach warning apparatus according to the present embodiment includes a memory independently storing a first sound source data for generating a signal of the low frequency component and a second sound source data for generating a signal of the high frequency component, generates a signal of the low frequency component using the first sound source data and a signal of the high frequency component using the second sound source data, performs adjustment of a signal level of the low frequency component and a signal level of the high frequency component so as to improve recognition by a pedestrian around the vehicle and output a warning sound from a speaker, and amplifies a warning sound synthesized with the signal of the low frequency component and the signal of the high frequency component after each of the levels is adjusted, at a fixed amplification factor. Since the amplified warning signal is outputted, it is possible that an uncomfortable feeling of a user caused when the warning sound is discontinuously changed is eliminated. It is possible that a warning sound improving a recognition by a pedestrian around the vehicle is outputted using a small amount data of the sound data as compared with a case where a warning sound is outputted with using three or more sound source data. The sound data corresponds to two independent sound source data of the first sound source data and the second sound source data.

In addition, the vehicle approach warning apparatus gradually decreases the sound pressure of the low frequency component and gradually increases the sound pressure of the high frequency component as the vehicle speed increases. Therefore, it is possible that the vehicle approach warning apparatus maintains the sound pressure level of the warning sound in a predetermined range as a whole, and notifies a pedestrian existing near and around the vehicle (in each direction of front, rear, right and left near the vehicle) of the warning sound at the time of the low speed traveling and a pedestrian existing in a traveling direction and comparatively distant from the vehicle of the warning sound at the time of the high speed traveling.

Second Embodiment

Figure 8:
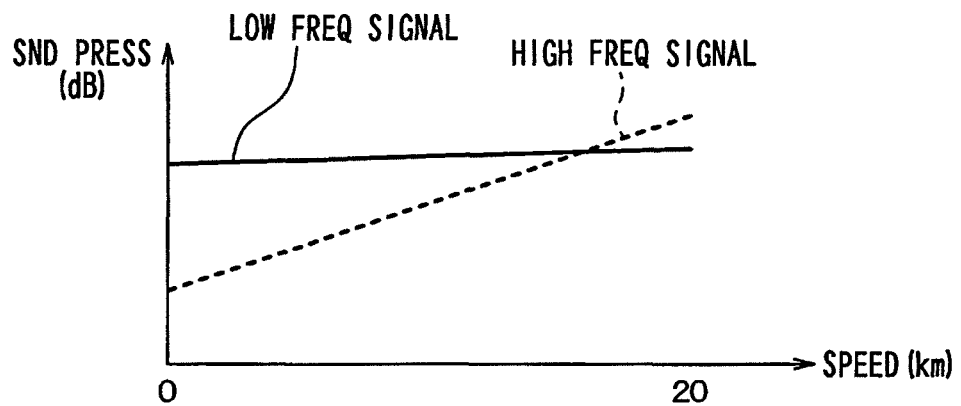
FIG. 8 is a drawing illustrating a relationship of a sound pressure of a low and high frequency component, which are included in the warning sound of the vehicle approach warning apparatus according to the second embodiment, and a vehicle speed.

In the first embodiment, as described in FIG. 3, according to increase of the vehicle speed, the signal level of the low frequency component gradually decreases, and the signal level of the high frequency component gradually increases. On the contrary, in the second embodiment, as described in FIG. 8, as the vehicle speed increases, the signal level of the high frequency component increases, and the signal level of the low frequency component also gradually increases. The low frequency component increases by a variation less than a predetermined reference value. A different part from the first embodiment will be mainly explained below. Incidentally, the identical symbol will be given to the identical part with the first embodiment, and a description will be omitted.

In the first embodiment, the memory 200 stores a table, representing that the factor increases linearly with respect to the PWM signal corresponding to the signal of the high frequency component, and another table, representing that the factor decreases linearly with respect to the PWM signal corresponding to the signal of the low frequency component, according to the increase of the vehicle speed. In the present embodiment, the memory 200 stores a table that a factor increases linearly with respect to the PWM signal corresponding to the signal of the high frequency component, and another table that a factor gradually increases linearly by a variation less than a predetermined reference value with respect to the PWM signal corresponding to a signal of a low frequency component, according to the increase of the vehicle speed.

The operation portion of the microcomputer 21 in the present embodiment performs a processing described in FIG. 6 with referring to the tables. By the processing, the signal level of the high frequency component increases according to the increase of the vehicle speed. In addition, the signal level of the low frequency component gradually increases according to the increase of the vehicle speed. That is, the signal level of the low frequency component increases by a variation less than the predetermined reference value.

Figure 9A:
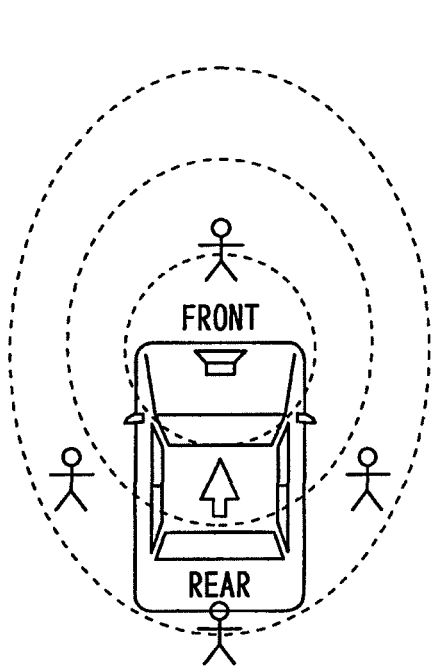
FIG. 9A is a drawing illustrating a distribution of the warning sound at the time of the low speed traveling of the vehicle approach warning apparatus according to the second embodiment.
Figure 9B:
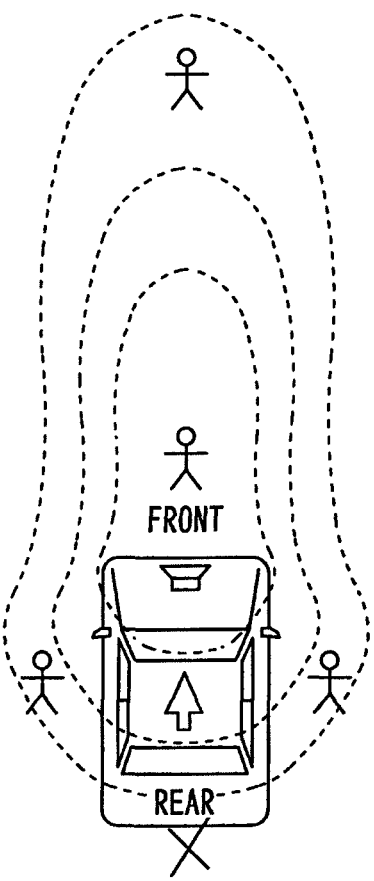
FIG. 9B is a drawing illustrating a distribution of the warning sound at the time of the high speed traveling of the vehicle approach warning apparatus according to the second embodiment.

FIG. 9A illustrates the distribution of the warning sound at the time of the low speed traveling. FIG. 9B illustrates the distribution of the warning sound at the time of the high speed traveling.

The sound pressure level of the low frequency component (low frequency) spreading to large areas such as a vehicle rear area is high, and the sound pressure level of the high frequency component (high frequency) is low at the time of the low speed traveling. Therefore, as described in FIG. 9A, it is possible that a pedestrian existing near and around the vehicle recognizes the warning sound.

On the contrary, at the time of the high speed traveling, since the sound pressure level of the low frequency component (low frequency) spreading to large areas such as the vehicle rear area is increased slightly, it is possible to improve recognition especially for elderly people, who has a hearing difficulty to a high frequency component (high frequency). In addition, the sound pressure level of the high frequency component (high frequency), which is easily recognized by a pedestrian at a comparatively distance from the vehicle, is increased. Therefore, as described in FIG. 9B, it is possible to also cause a pedestrian existing at a comparatively distance of the vehicle in a vehicle traveling direction, to recognize the warning sound.

As described above, according to the increase of the vehicle speed, the signal level of the low frequency component is changed by the variation less than the predetermined reference value, and in addition, the signal level of the high frequency component increases. Therefore, at the time of the low speed traveling, it is possible that a pedestrian around the vehicle recognizes the warning sound. In addition, at the time of the high speed traveling, it is possible to notify a pedestrian existing in a traveling direction and comparatively distantly from the vehicle of the warning sound. Furthermore, it is possible to improve recognition especially for elderly people, who have a hearing difficulty to a high frequency component (high frequency).

Incidentally, the present disclosure is not limited to the described embodiments, and it is possible to be realized in various forms based on a scope of the present disclosure.

For example, in the present embodiment, the speaker outputs the warning sound according to the vehicle speed to improve recognition of a pedestrian around the vehicle, the signal levels of the low frequency and the high frequency are adjusted, and the PWM signals are generated from the sound source data as the warning sound signal for outputting the warning sound. However, for example, a D/A conversion circuit may be used to generate a warning sound signal of an analog signal.

Furthermore, in the present embodiment, according to the increase of the vehicle speed, the signal levels of the low frequency component and the high frequency component are changed linearly. However, for example, signal levels of the low frequency component and the high frequency component may be changed curvedly, that is, the signal level may be changed continuously.

The memory 200 corresponds to a memory portion, the PWM signal output portions 220a, 220b correspond to a signal generation portion, S106 and S108 correspond to a level adjustment portion, the mixer 23 corresponds to a signal synthesizing portion, and the amplifier 24 corresponds to an amplifier in the present disclosure.

According to one aspect of the present disclosure, a vehicle approach warning apparatus outputting a warning sound signal for outputting a warning sound, and generating the warning sound according to the warning sound signal from a speaker, and notifying a pedestrian around a vehicle that the vehicle approaches to the pedestrian is provided. The vehicle approach warning apparatus includes (i) a memory portion storing a first sound source data for generating a signal of a low frequency component, and a second sound source data for generating a signal of a high frequency component, (ii) a signal generation portion generating the signal of the low frequency component using the first sound source data, and generating the signal of the high frequency component using the second sound source data, (iii) a level adjustment portion adjusting a level of the signal of the low frequency component to generate an adjusted signal of the low frequency component, and a level of the signal of the high frequency component to provide an adjusted signal of the high frequency component, so that the speaker outputs, according to a vehicle speed, the warning sound of which a recognition for the pedestrian around the vehicle is improved, (iv) a signal synthesizing portion outputting a synthesized warning sound signal synthesized from the adjusted signal of the low frequency component and the adjusted signal of the high frequency component, and (v) an amplifier amplifying the synthesized warning sound signal by a predetermined amplification factor, and outputting an amplified warning sound signal as the warning sound signal.

According to the vehicle approach warning apparatus, the vehicle approach warning apparatus includes a memory portion storing a first sound source data for generating the signal of the low frequency component and a second sound source data for generating the signal of the high frequency component, generates the signal of the low frequency component using the first sound source data and the signal of the high frequency component using the second sound source data, adjusts a level of the signal of the low frequency component to generate an adjusted signal of the low frequency component, and a level of the signal of the high frequency component to provide an adjusted signal of the high frequency component, so that the speaker outputs, according to a vehicle speed, the warning sound of which a recognition for the pedestrian around the vehicle is improved, amplifies a synthesized warning sound signal, which is synthesized from a signal of the low frequency component and a signal of the high frequency component after adjustment of each level, by a predetermined amplification factor, and outputs the amplified warning sound signal. Therefore, it is possible that the vehicle approach warning apparatus outputs the warning sound to improve recognition by a pedestrian around the vehicle by a small data amount of sound source data with eliminating uncomfortable feeling of a user when the warning sound is discontinuously changed.

In addition, according to another aspect of the present disclosure, the level adjustment portion decreases the level of the signal of the low frequency component, and increases the level of the signal of the high frequency component according to an increase of a vehicle speed.

According to this configuration, since the level of the low frequency component decreases and the level of the high frequency component increases according to the increase of the vehicle speed, it is possible that the sound pressure level of the warning sound as a whole is maintained within a predetermined range. Therefore, it is possible to notify a pedestrian existing near and around the vehicle (in each direction of front, rear, right and left near the vehicle) of the warning sound at the time of the low speed traveling, and to notify a pedestrian existing in a traveling direction and comparatively distant from the vehicle of the warning sound at the time of the high speed traveling.

In addition, according to another aspect of the present disclosure, the level adjustment portion increases the level of the signal of the low frequency component by a variation less than a predetermined reference value, and increases the level of the signal of the high frequency component according to an increase of a vehicle speed.

According to this configuration, since the signal level of the low frequency component is changed by the variation less than the predetermined reference value, and in addition, the signal level of the high frequency component increases according to the increase of the vehicle speed, it is possible that a pedestrian existing near and around the vehicle recognizes the warning sound at the time of the low speed traveling. In addition, at the time of the high speed traveling, it is possible to notify a pedestrian existing in a traveling direction and comparatively distantly from the vehicle of the warning sound. It is possible to improve recognition especially for elderly people, who have a hearing difficulty to a high frequency component (high frequency).

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle approach warning apparatus outputting a warning sound signal, and causing a speaker to output a warning sound according to the warning sound signal, and notifying a pedestrian around a vehicle that the vehicle approaches the pedestrian, the vehicle approach warning apparatus comprising:
   a memory that stores
      a first sound source data for a PWM signal of a low frequency component,
      a second sound source data for a PWM signal of a high frequency component; and
      a first table setting a first factor corresponding to a duty ratio of the PWM signal of the low frequency component to increase and a second table setting a second factor corresponding to a duty ratio of the PWM signal of the high frequency component to decrease as the vehicle speed increases;
   a first signal generation portion configured to generate the PWM signal of the low frequency component from the first sound source data, and
   a second signal generation portion configured to generate the PWM signal of the high frequency component from the second sound source data, the second signal generation portion being different from the first signal generation portion;
   a processor;
   a signal synthesizing portion; and
   an amplifier,
   the processor is configured to
      adjust, in a level adjustment portion, when a speed of the vehicle changes,
         a level of the PWM signal of the low frequency component to generate an adjusted signal of the low frequency component, and
         a level of the PWM signal of the high frequency component to generate an adjusted signal of the high frequency component;
      decrease, in the level adjustment portion, the level of the PWM signal of the low frequency component and increase the level of the PWM signal of the high frequency component as the vehicle speed increases;
      maintain a sound pressure level of the warning sound as a whole sound pressure level before and after adjustment of the level of the PWM signal of each of the low frequency component and the high frequency component, and cause the speaker to output the warning sound with improved recognition for the pedestrian around the vehicle;
      synthesize, by the signal synthesizing portion, the adjusted signal of the low frequency component and the adjusted signal of the high frequency component to provide a synthesized warning sound signal, and output the synthesized warning sound signal to the amplifier; and
   the amplifier is configured to receive the synthesized warning sound signal from the signal synthesizing portion, to amplify the synthesized warning sound signal by a predetermined amplification factor to generate an amplified warning sound signal, and to output the amplified warning sound signal to the speaker,
   wherein:
   the whole sound pressure level of the warning sound generated by the speaker according to the amplified warning sound signal is maintained in changing the level of the PWM signal of the low frequency component and the level of the PWM signal of the high frequency component when the vehicle speed changes; and
   when the processor adjusts, in the level adjustment portion, the level of the PWM signal of the low frequency component and the level of the PWM signal of the high frequency component, the processor refers to the first table which specifies the first factor corresponding to the duty ratio of the PWM signal of the low frequency component and the second table stored in the memory which specifies the second factor corresponding to the duty ratio of the PWM signal of the high frequency components, and adjusts the level of the PWM signal of the low frequency component and the level of the PWM signal of the high frequency component respectively while using the first factor specified by the first table and the second factor specified by the second table.

2. The vehicle approach warning apparatus according to claim 1, wherein
   the level adjustment portion increases the level of the PWM signal of the low frequency component by a variation less than a predetermined reference value, and increases the level of the PWM signal of the high frequency component with an increase of the vehicle speed.

3. The vehicle approach warning apparatus according claim 1, wherein
   the first table represents a relationship between the vehicle speed and the first factor corresponding to the duty ratio of the PWM signal of the high frequency component, and
   the second table represents a relationship between the vehicle speed and the second factor corresponding to the duty ratio of the PWM signal of the low frequency component,
   the first factor corresponding to the PWM signal of the high frequency component linearly increases with the increase of the vehicle speed,
   the second factor corresponding to the PWM signal of the low frequency component linearly decreases with the increase of the vehicle speed, and
   the level adjustment portion is further configured to
      specify the first factor that corresponds to the vehicle speed with respect to the PWM signal of the high frequency component based on the first table, and
      specify the second factor that corresponds to the vehicle speed with respect to the PWM signal of the low frequency component based on the second table.

4. The vehicle approach warning apparatus according to claim 3, wherein
   a frequency band of the low frequency component is 100 Hertz to 900 Hertz, and
   a frequency band of the high frequency component is 1500 Hertz to 4000 Hertz.

5. The vehicle approach warning apparatus according to claim 4, wherein
   the vehicle approach warning apparatus is mounted to the vehicle.

6. A vehicle approach warning apparatus outputting a warning sound signal, and causing a speaker to output a warning sound according to the warning sound signal, and notifying a pedestrian around a vehicle that the vehicle approaches the pedestrian, the vehicle approach warning apparatus comprising:
   a memory that stores
      a first sound source data for a PWM signal of a low frequency component,
      a second sound source data for a PWM signal of a high frequency component; and
      a first table setting a first factor corresponding to a duty ratio of the PWM signal of the low frequency component to increase and a second table setting a second factor corresponding to a duty ratio of the PWM signal of the high frequency component to decrease as the vehicle speed increases;

a first signal generation portion configured to generate the PWM signal of the low frequency component from the first sound source data, and a second signal generation portion configured to generate the PWM signal of the high frequency component from the second sound source data, the second signal generation portion being different from the first signal generation portion;

a processor;

a signal synthesizing portion; and an amplifier, the processor is configured to
- adjust, in a level adjustment portion, when speed of the vehicle changes,
  - a level of the PWM signal of the low frequency component to generate an adjusted signal of the low frequency component, and
  - a level of the PWM signal of the high frequency component to generate an adjusted signal of the high frequency component,
- decrease, in the level adjustment portion, the level of the PWM signal of the low frequency component and increase the level of the PWM signal of the high frequency component as the vehicle speed increases,
- maintain a sound pressure level of the warning sound as a whole sound pressure level at a same predetermined value before and after adjustment of the level of the PWM signal of each of the low frequency component and the high frequency component, and cause the speaker to output the warning sound with improved recognition for the pedestrian around the vehicle;
- synthesize, by the signal synthesizing portion, the adjusted signal of the low frequency component and the adjusted signal of the high frequency component to provide a synthesized warning sound signal, and output the synthesized warning sound signal to the amplifier; and the amplifier is configured to receive the synthesized warning sound signal from the signal synthesizing portion, to amplify the synthesized warning sound signal by a predetermined amplification factor to generate an amplified warning sound signal, and to output the amplified warning sound signal to the speaker, wherein:

the whole sound pressure level of the warning sound generated by the speaker according to the amplified warning sound signal is maintained at the predetermined value in changing the level of the PWM signal of the low frequency component and the level of the PWM signal of the high frequency component when the vehicle speed changes; and when the processor adjusts, in the level adjustment portion, the level of the PWM signal of the low frequency component and the level of the PWM signal of the high frequency component, the processor refers to the first table which specifies the first factor corresponding to the duty ratio of the PWM signal of the low frequency component and the second table stored in the memory which specifies the second factor corresponding to the duty ratio of the PWM signal of the high frequency component, and adjusts the level of the PWM signal of the low frequency component and the level of the PWM signal of the high frequency component respectively while using the first factor specified by the first table and the second factor specified by the second table.

7. The vehicle approach warning apparatus according to claim 6, wherein the level adjustment portion increases the level of the PWM signal of the low frequency component by a variation less than a predetermined reference value, and increases the level of the PWM signal of the high frequency component with an increase of the vehicle speed.

8. The vehicle approach warning apparatus according claim 6, wherein the first table represents a relationship between the vehicle speed and the first factor corresponding to the duty ratio of the PWM signal of the high frequency component, and the second table represents a relationship between the vehicle speed and a second factor corresponding to the duty of the PWM signal of the low frequency component, the first factor corresponding to the PWM signal of the high frequency component linearly increases with the increase of the vehicle speed, the second factor corresponding to the PWM signal of the low frequency component linearly decreases with the increase of the vehicle speed, and the level adjustment portion is further configured to
- specify the first factor that corresponds to the vehicle speed with respect to the PWM signal of the high frequency component based on the first table, and
- specify the second factor that corresponds to the vehicle speed with respect to the PWM signal of the low frequency component based on the second table.

9. The vehicle approach warning apparatus according to claim 8, wherein a frequency band of the low frequency component is 100 Hertz to 900 Hertz, and a frequency band of the high frequency component is 1500 Hertz to 4000 Hertz.

10. The vehicle approach warning apparatus according to claim 9, wherein the vehicle approach warning apparatus is mounted to the vehicle.

* * * * *